Oct. 18, 1932.  E. B. ROBY  1,882,923
FOLDING MACHINE
Filed Aug. 19, 1926   8 Sheets-Sheet 6

INVENTOR
EDWARD B. ROBY.
BY Daniel L. Morris
ATTORNEY

Oct. 18, 1932.  E. B. ROBY  1,882,923
FOLDING MACHINE
Filed Aug. 19, 1926   8 Sheets-Sheet 8

INVENTOR
EDWARD B. ROBY.
BY Daniel L. Morris
ATTORNEY

Patented Oct. 18, 1932

1,882,923

UNITED STATES PATENT OFFICE

EDWARD B. ROBY, OF NEW YORK, N. Y., ASSIGNOR TO S. AND R. FOLDING MACHINE COMPANY, INC., OF GREEN ISLAND, NEW YORK, A CORPORATION OF NEW YORK

FOLDING MACHINE

Application filed August 19, 1926. Serial No. 130,133.

The present invention relates to a machine and method for folding the edges of textiles and fabrics.

Machines which have been used for this purpose in the past consist of a bed plate, infolders, and a head carrying a die, which operate in synchronism to fold the edges of the blank. As usually constructed, the die is of a collapsible nature and the edges of the blank are first folded over it. The die is next collapsed and withdrawn from engagement with the blank. The head of the machine with the die is then raised out of engagement with the blank, and the blank is pressed between the infolders and the bed plate to complete the folding operation. In machines which have been previously used a manual feed for the blank has been employed, which is attended with considerable danger to the operator of the machine. Moreover in the old type of machine the collapsible die has been found not to be entirely satisfactory, as it often spoils the blank and it does not always function in the manner desired.

The present invention involves certain improvements in folding machines of the above character, a good example of which is shown in my pending application, Serial Number 122,307, filed July 14, 1926. In the machine of the present application the collapsible die is dispensed with and an altogether new type of die which operates on a new principle is employed. This die instead of being collapsed in order to withdraw it from engagement with the blank is stripped from the blank. The present machine also is provided with means for automatically feeding the blank to the machine in addition to means for automatically withdrawing it after the folding operation has been completed. This renders the machine more automatic in character, resulting in increased production and at the same time it does away with the dangers to the operator incident to the manual feeding of the blank.

Reference will now be had to the accompanying drawings forming a part of this specification, and showing the preferred modification of the invention, in which Figure 3 is a top or plan view partly broken away to show more clearly the construction of the infolders.

Referring now to the drawings in which like reference numerals indicate like elements throughout the various views, the invention is embodied in a machine which comprises a main shaft 10, adapted to be continuously rotated as by means of a motor, which main shaft is mounted in bearings, 11, and 12, in the frame, 13, of the machine. The bed plate of the machine is indicated by the numeral, 14, and is supported on the top of a vertically sliding rod, 15, which is adapted for sliding movement in bearings, 16 and 17, mounted in the frame of the machine. The lower end of the rod, 15, is provided with a cavity in which is disposed a resilient or shock absorbing element, such as a coil spring, 18. The bed plate is actuated through the spring by means of a plunger, 19, situated within the cavity and carrying a roller, 20, which bears on a cam, 21, carried by the main shaft of the machine. The cam is so designed that as it rotates it produces the desired movement of the bed plate.

Figure 2:
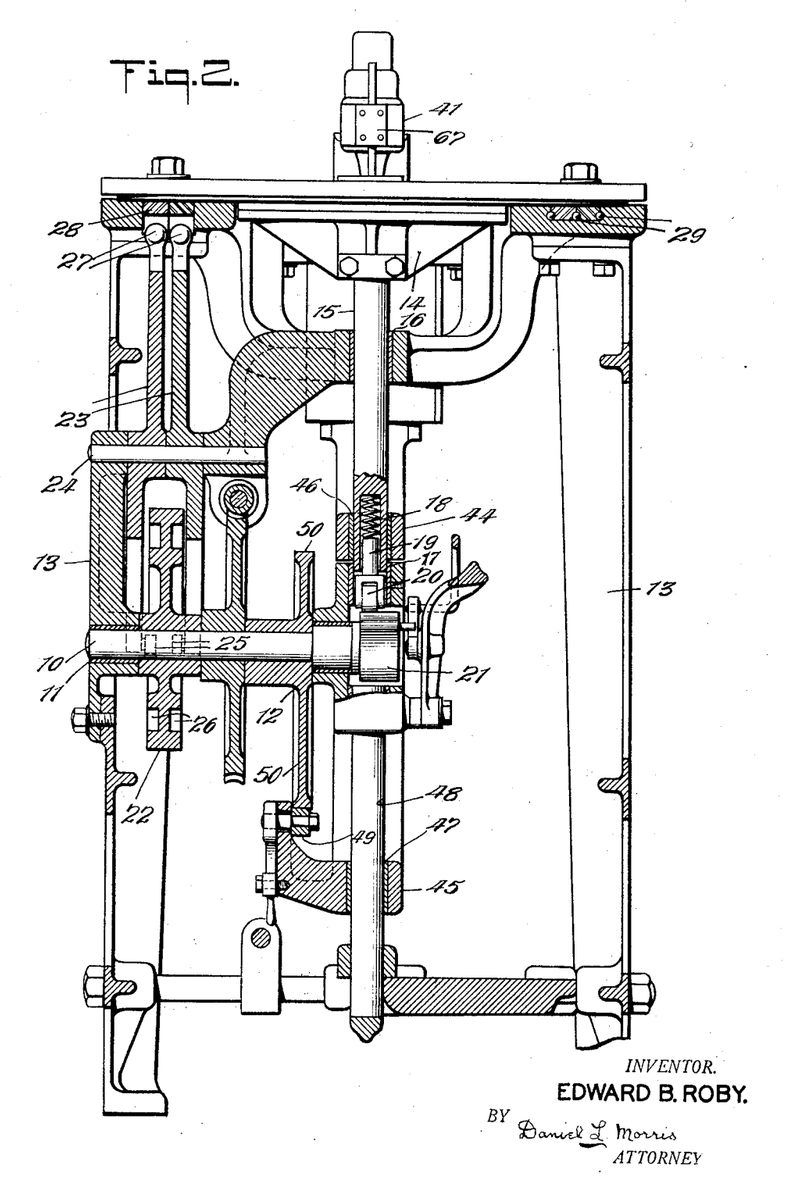
Figure 2 is a sectional elevational view taken through the center of the machine.

The infolders of the machine are also driven from the main shaft, 10, and for this purpose said shaft has a cam, 22, which is adapted to rotate with it. This cam serves to oscillate the levers, 23, which are pivoted on a shaft, 24, mounted in the frame on the machine. The lower end of the levers carry rollers, 25, shown in dotted lines in Figure 2, which fit in grooves, 26, in the sides of the cam. The motion of the levers is determined by the shape of the grooves. The upper ends of the levers terminate in knobs, 27, fitting in mortises in the concentric rings, 28, which are adapted for rotatable movement on ball bearings, 29. To each ring there is secured a number of vertically projecting pins, 30, which extend through circular slots, 31, in a plate, 32, covering the top of the rings. The pins also extend through oblique slots, 33, in the infolders, 34, of the machine. The infolders are in the form of slides adapted for reciprocating movement. As best shown in Figure 3, in the form of the invention illustrated, there are six infolders used. The three larger infolders are operated from the outer ring and the three smaller infolders are operated from the inner ring. As the rings rotate the action of the pins in the slots of the infolders cause reciprocating motion of said infolders. The slots in the cam are so designed that the inner lever, 23, and consequently the inner ring is operated first to cause the smaller infolders to move inward a short time before the larger infolders move inward.

Figure 6:
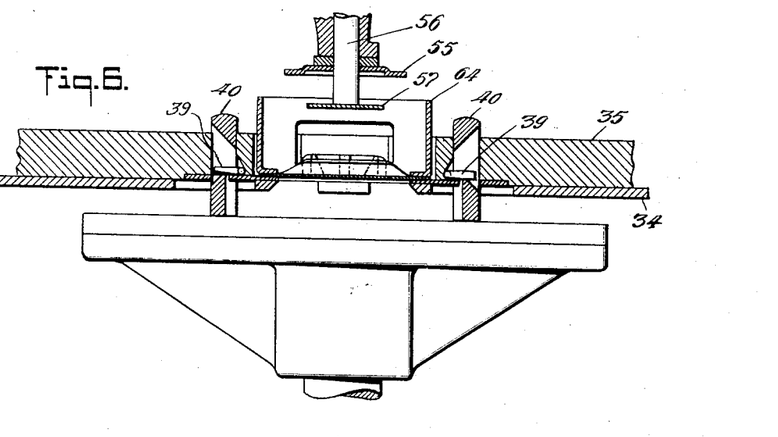

The top of the machine is covered with a top plate, 35, which is bolted or otherwise secured thereto. The under surface of the top plate is preferably provided with a number of grooves in which the infolders fit and which serve to guide the infolders in their movements. The top plate is centrally cut away a sufficient amount to allow the blank which is to be folded to fit therein. A number of small pieces or tumblers, 36, are pivoted on small horizontal shafts, 37, mounted in the top plate and are disposed around the cut away portion of the top plate, as will be seen from Figure 3. The top plate is also provided with a projecting shelf, 38, on which the blank initially rests. Each of the small shafts, 37, has an offset or oblique end, 39, which offset ends project into slots formed in the vertical movable pins, 40. These pins extend vertically through perforations in the top plate, which permit a vertical movement of the same. The infolders are provided with slots through which the pins extend so that the pins do not interfere with the action of the infolders. The tumblers are adapted to be rotated on their pivots by the bed plate through the pins. As shown in Figure 6, the tumblers are disposed in horizontal positions when the bed plate is lowered, but when the bed plate is elevated it lifts the pins which rotate the tumblers to their vertical positions.

The head of the machine, generally designated by the numeral, 41, is carried by a bracket, 42, which is guided for vertical movement in a member, 43, secured near the top of the machine. The lower end of the bracket has two arms, 44 and 45, which are provided with bearings, 46 and 47, to permit them to slide vertically on the sliding rod, 15, and on a rod, 48, which is fixed in the frame of the machine. The lower arm, 45, carries a roller, 49, which is acted on by a large cam, 50, secured to the main shaft. The head of the machine is biased to its elevated position by means of a heavy coil spring or springs, 51, the upper ends of which are secured to the upper part of the frame of the machine, the lower ends of which are secured to the bracket, 42, near the lower portion thereof. The head is positively moved downward against the action of the spring by the cam, 50, acting upon the roller, 49.

Figures 4, 14, 15, 16:
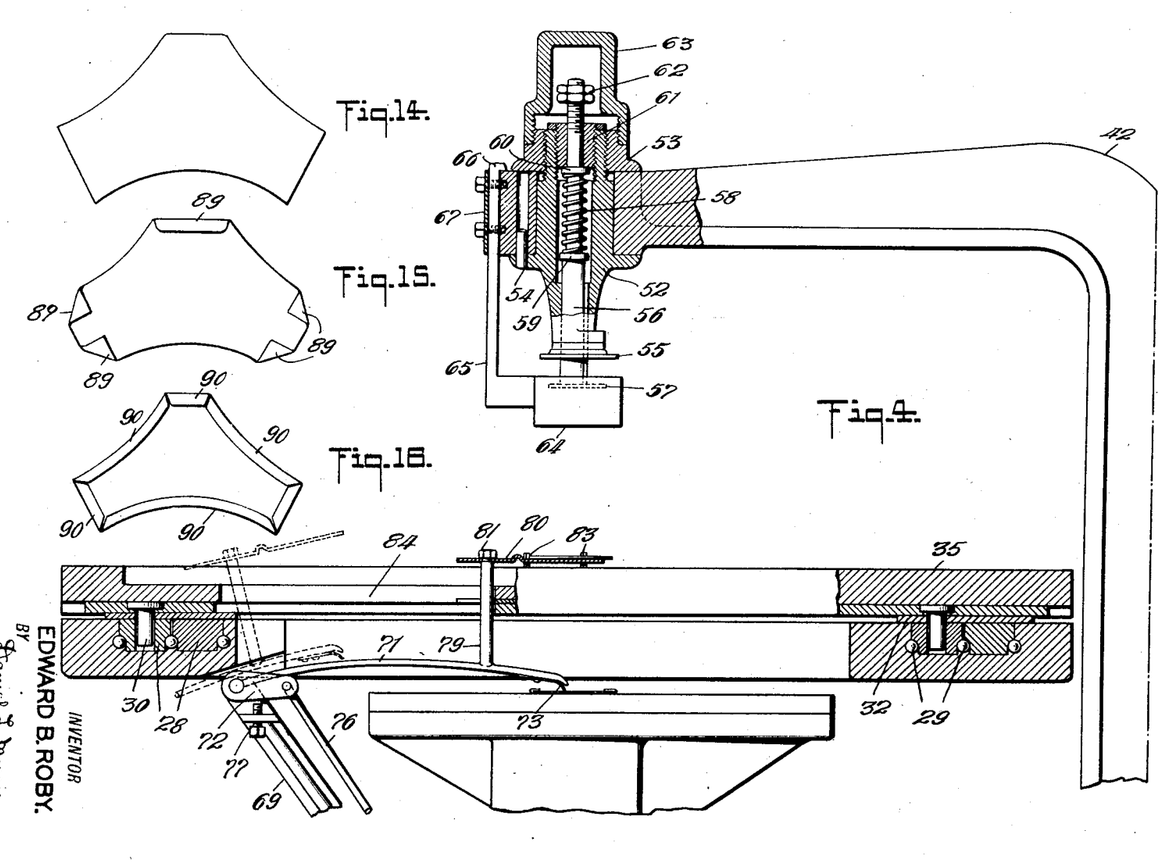
Figure 4 is a sectional view on an enlarged scale, showing the nature of the head, the die, and other parts of the machine, Figures 5 to 13, inclusive, are sectional elevational views showing the positions of the folding elements at various states in the folding operation.
Figure 14 is a view of the blank to be folded.
Figure 15 is a view of the blank partially folded.
Figure 16 is a view of the blank completely folded, Figures 17 to 25, inclusive, are views showing the positions of the actuating means for the folding elements at the various stages in the folding operation shown in Figures 5 to 13, inclusive.

The structure of the head and its die is best shown in Figure 4. It comprises a main body portion, 52, which is clamped to the bracket, 42, by means such as a lock nut, 53. Means are provided for preventing rotation of the body portion with respect to the bracket, which means is shown in the form of a pin, 54, extending through a part of the body portion and into a perforation in the bracket. The lower portion of the body portion terminates in a flange, 55, which serves as the die. The body portion is also provided with a longitudinal bore, in which fits the plunger, 56, which under certain circumstances constitutes a clamping member, as will hereinafter appear. This plunger is provided at its lower end with a flange, 57. The plunger is biased to its lower position by means of gravity and a spring, 58, which is coiled around it, said spring bearing at its lower end against an abutment, 59, formed on the plunger and at its upper end against a washer, 60, which washer is held in place by a plug, 61, closing the upper end of the body portion. The plunger is adapted for sliding vertical movement within the body portion, and suitable means such as a tongue and groove arrangement may be employed to prevent rotation thereof. The upper end of the plunger projects through the plug and means such as nuts, 62, are secured to it, which limit the extent of its downward movement and prevent it from falling out of the body portion. A cap, 63, is preferably threaded over the top of the lock nut, 53, and covers the projecting end of the plunger.

In connection with the above structure, a box-like clamp, 64, shown substantially rectangular in shape is employed for purposes which will be more apparent later on. The clamp has an arm, 65, the upper part of which terminates in an oblique end, 66, which serves to limit the extent of the clamp's downward movement with respect to the bracket. The clamp is adapted for sliding vertical movement with respect to the bracket and is guided in its movements by a plate, 67, bolted to the side of the bracket. This plate holds the arm, 65, in place, but permits it to be moved vertically and serves essentially as a guide.

In the machine of the present invention means are provided for automatically feeding the blank to the machine and for automatically conveying it to a chute, 68, on the front of the machine after the folding operation has been completed. In the machine of my prior application, Serial No. 122,307, filed July 14, 1926, I have disclosed means whereby the blank may be automatically withdrawn from the machine after the folding operation has been performed. In the machine of that application, however, the blanks are fed manually to the machine. In the machine of the present application, I provide, in addition, automatic means for feeding the blank. This renders the machine more automatic in character, resulting in increased production and at the same time it does away with the dangers to the operator of the machine incident to a manual feed of the blank, for where a manual feed is employed the hand of the operator is disposed beneath the descending head of the machine and ofttimes is injured, due to carelessness on his part.

The automatic means of the present invention includes a rigid bar, 69, curved near its lower end and pivoted to a portion of the frame of the machine by a bolt, 70. At the upper end of the bar a slender arm, 71, is pivotally secured, which arm has a link, 72, rigidly attached thereto, so that the arm and the link rotate together. The free end of the arm terminates in a downwardly directed point, and there is a leaf spring, 73, disposed in proximity to this point. Near the lower end of the bar a trigger, 74, is pivoted at 75, which trigger is secured to the link, 72, by means of a rod, 76. The bar carries two stops, 77 and 78, which determine the extent of movement of the link and trigger. Stop, 77, determines the extent of the downward movement of the link and the stop, 78, determines the extent of the upward movement of the trigger. The link, the trigger, and the rod, 76, form with the bar, 69, a four-bar linkage pivoted at two points and adapted to be oscillated through a pre-determined angle.

Figure 1:
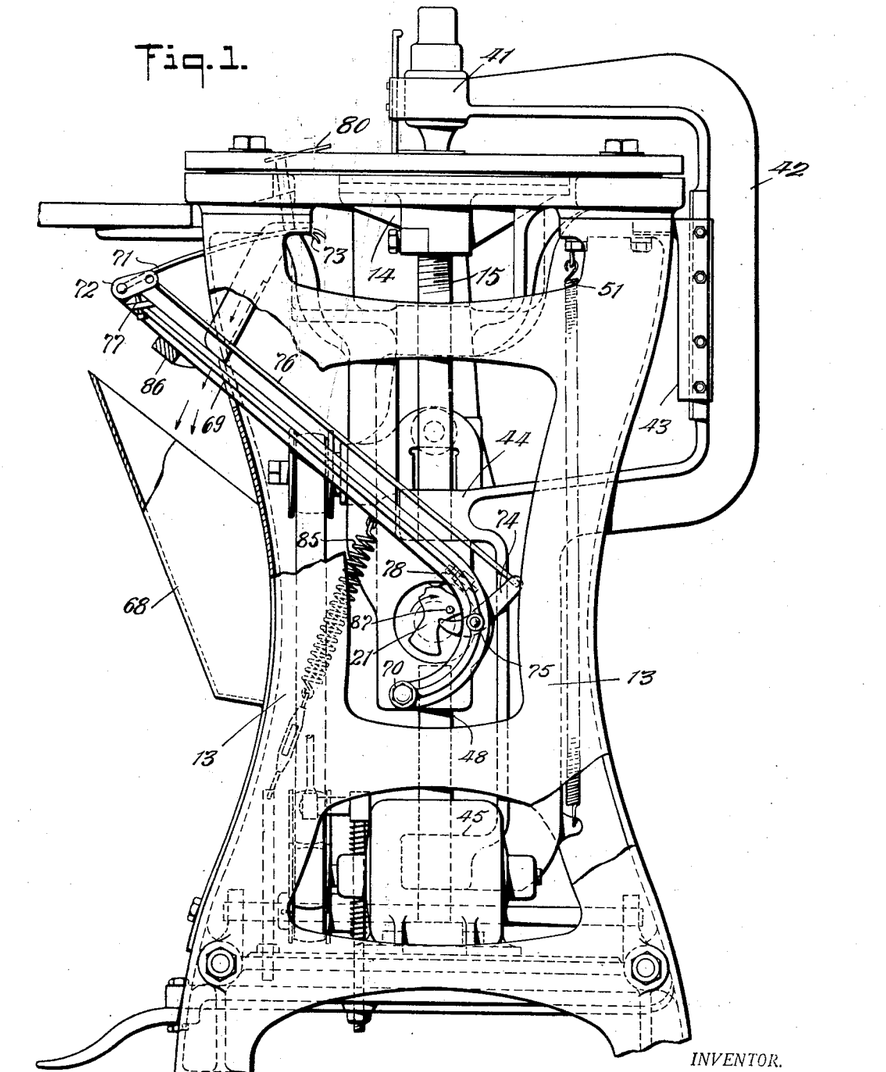
Figure 1 is a side elevational view of the machine with the parts broken away to show more clearly the construction of certain features.

Near the free end of the arm, 71, as best shown in Figure 4, there is attached a vertical rod, 79, to the top of which is secured a shelf, 80, as by means of a nut, 81. The top plate, 35, of the machine is provided with a number of small pieces, 82, having upstanding fingers, 83, for positioning the blank. These small pieces are adjustably positioned in grooves in the top plate of the machine. The fingers serve to position the blank in the machine and they may be adjusted to conform to various shapes of blanks. The vertical member, 79, extends through a slot, 84, in the infolder and the top plate, which permit it to be moved back and forth through a certain distance. The bar, 69, is normally maintained in the retracted position shown in Figure 1 by means of gravity and by a heavy spring, 85, in which position it rests against a support or backrest, 86. It is adapted to be moved forward against the action of the spring and gravity by means of a stud, 87, which is carried by the cam, 21. The shelf, 80, is provided with a number of slots, 88, which serve to prevent the fingers, 83, from interfering with its operation.

In the operation and use of the automatic feeding means, the operator of the machine places a blank on the shelf, 80. As the cam, 21, rotates, it carries the stud, 87, with it and after a certain amount of rotation the stud strikes the projecting end of the trigger, 74, and swings it about its pivot, 75, causing the arm, 71, and the shelf, 80, to be lifted to their elevated positions. Further rotation of the stud causes the bar, 69, to be rotated around its pivot, 70, and the end of the arm, 71, with the shelf, 80, to be moved in over the center of the machine. The stud now passes the end of the trigger and the arm, 71, is released, the free end thereof falling upon the folded blank, as shown in Figure 4, and the shelf being lowered to deposit the new blank between the fingers, 83. The slots, 88, in the shelf permit it to be so lowered, it being understood that the fingers project through said slots. The bar, 69, is now withdrawn under the action of the spring, 85, the shelf is swept from under the new blank which is held by the fingers, 83, in position to be operated upon, and the pointed end of the arm, 71, sweeps the folded blank into the chute, 68. The leaf spring, 73, serves as a shock absorbing medium and prevents the pointed end of the arm from piercing or soiling the folded blank when it falls upon it. Of course, it will be understood that the parts are so designed that when the stud passes the end of the trigger, the arm, 71, and the shelf, 80, fall before the bar, 69, is retracted. This is essential to a successful operation of the machine.

The machine is shown adapted to fold a blank to form a pad for men's garters. The shape of this blank is shown in Figure 14. The corners, 89, are first folded, as shown in Figure 15, and then the edges, 90, are folded to form the completed folded article, which is shown in Figure 16.

Figure 5:
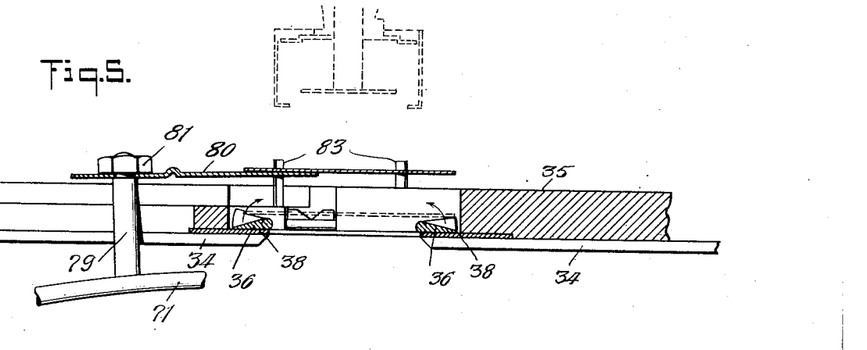
Figure 7:
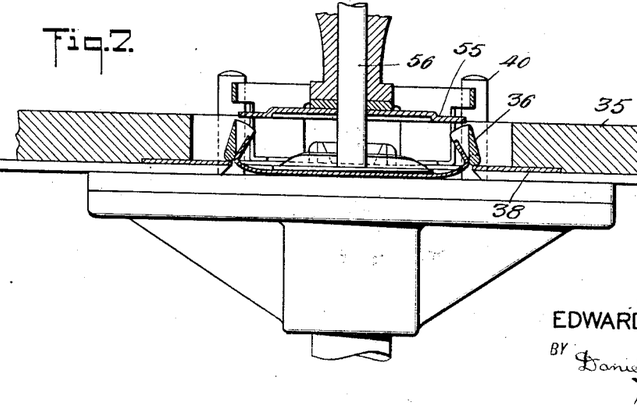
Figure 8:
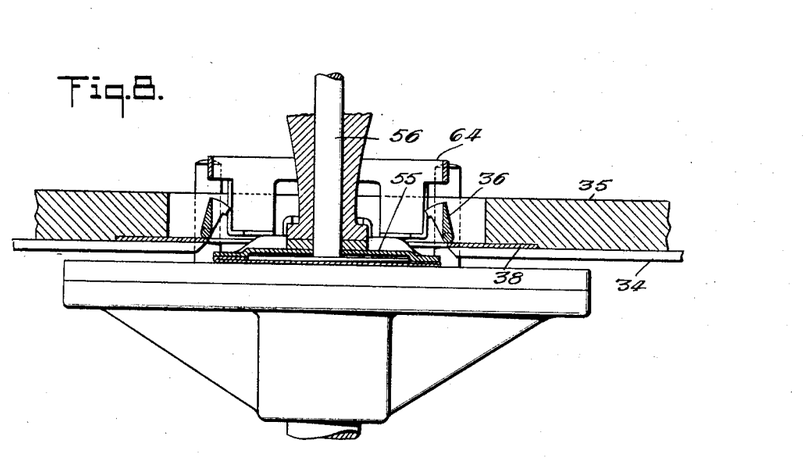
Figure 9:
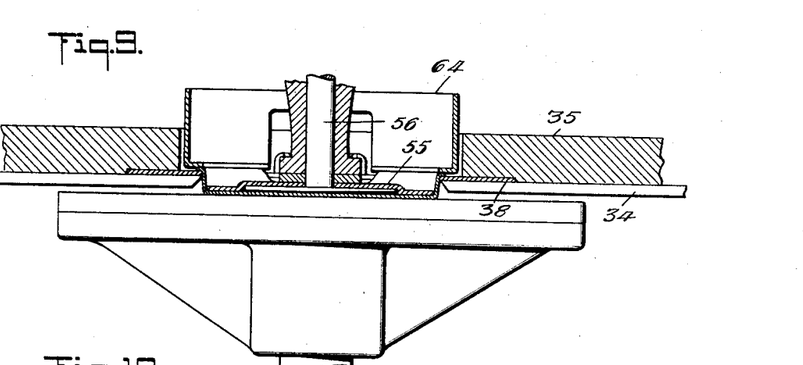
Figure 10:
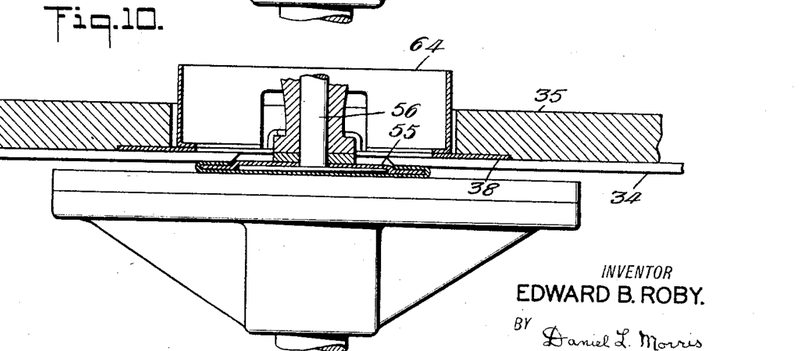
Figure 11:
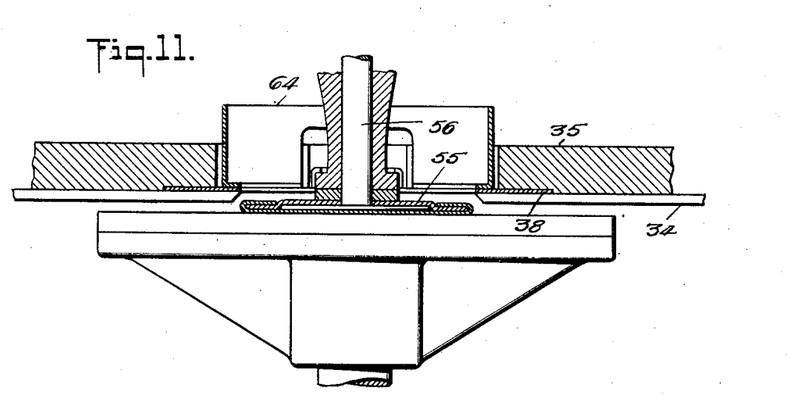
Figure 12:
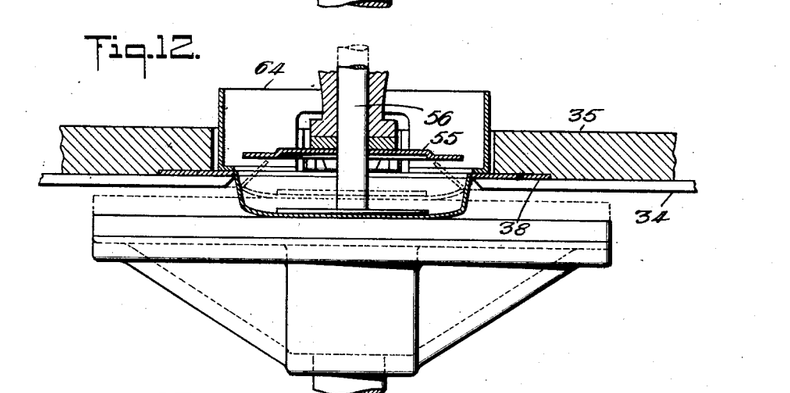
Figure 13:
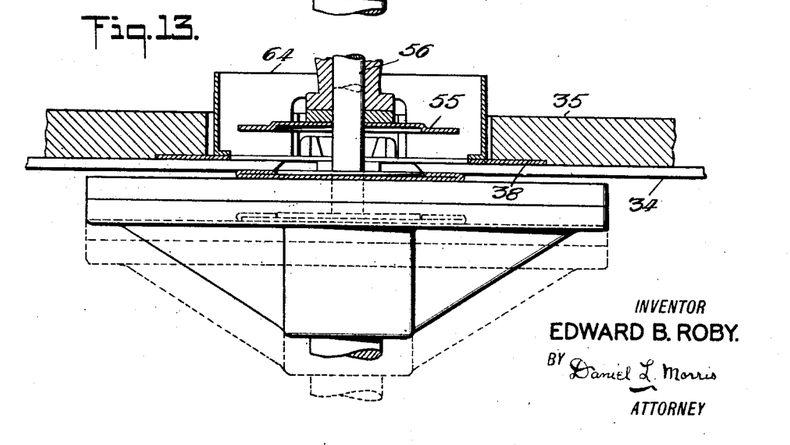
Figures 17, 18, 19:
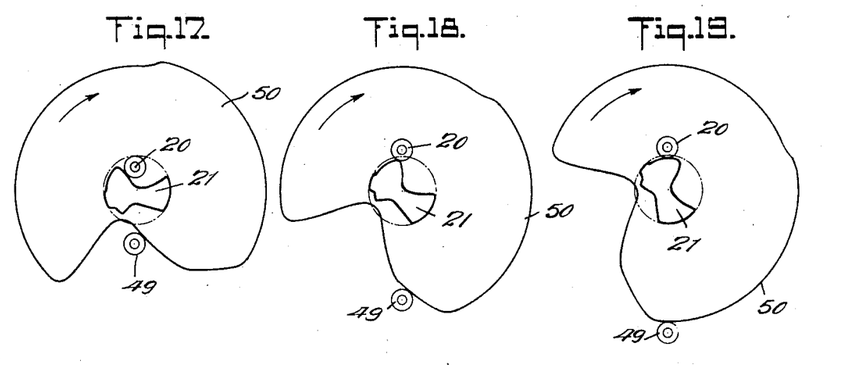
Figures 20, 21:
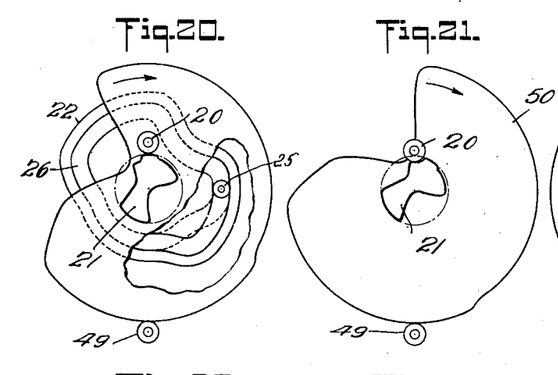
Figure 22:
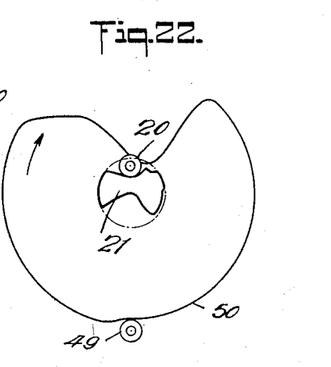
Figure 23:
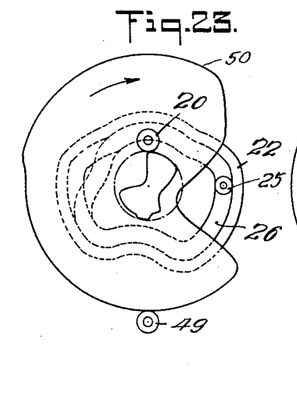
Figures 24, 25:
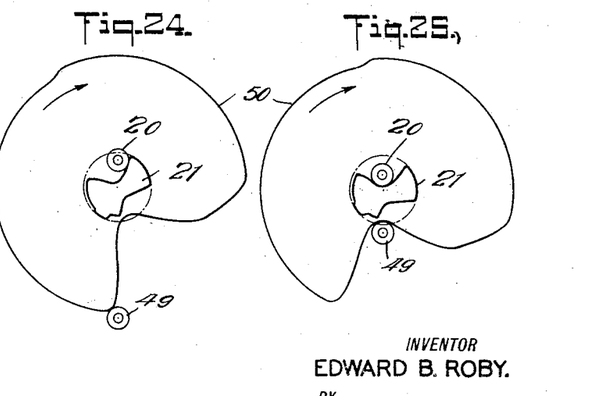

The blank is placed on the shelf, 80, by the operator of the machine, and it is automatically deposited between the fingers 83, by the shelf so that it rests at its five corners on the top of the five tumblers, as shown in Figure 5. At this stage in the folding operation, the cams for operating the various folding elements are in the position shown in Figure 17, so that the head and the die are in their elevated positions and the bed plate is in its lowered position. Rotation of the cams in the direction shown in Figure 18 causes the head to be lowered and at the same time the bed plate is elevated. Their movement is such that the clamp, 64, reaches the blank before the bed plate strikes the pins, 40, the clamp holding the sides of the blank down on the shelf, 38. This position is shown in Figure 6. The speed of the head in its downward path is slowed down after the clamp and the plunger, 56, reach the blank, due to the fact that the roller, 49, bears against a more gradual curve in the cam, 50. This allows the bed plate to lift the pins and to rotate the tumblers, 36, to their vertical positions, shown in Figure 7, and to turn up the corners, 89, of the blank. The bed plate is so raised by its cam, 21, that it is forced firmly against the underside of the infolders, 34, and the spring, 18, within the rod, 15, is compressed. The head carrying the flange, or die, 55, continues on downward and the die strikes the corners, 89, which have been up-turned by the tumblers, and forces them down on the bed plate. As the head continues on downward, the die depresses the bed plate against the action of the spring, 18, to approximately the thickness of the blank and the flange. This stage in the folding operaton is shown in Figures 8 and 9, which are different sectional views taken at the same stage in the operation. The infolders now move inward to fold the sides of the blank over the die, as shown in Figure 10. The smaller infolders move in first to fold the small sides of the blank and then the larger infolders move in to fold the large sides. As pointed out above, the cam, 22, is so designed that it actuates the levers, 23, at different times to cause this action of the infolders. The bed plate is now moved up slightly because of the roller, 20, striking a slight swell in the cam, 21, as shown in Figure 20, so that the blank is forced up against the undersides of the infolders. This results in a preliminary folding of the blank. The roller, 20, which operates the bed plate, now strikes a depression in its cam, 21, as shown in Figure 21, causing the spring pressure in the bed plate to be removed and the bed plate to fall down somewhat, as shown in Figure 11. The roller, 49, next strikes a depression in the cam, 50, which allows the head to be moved upward by the heavy coil springs, 51, so that the die is above the infolders. At the same time, the bed plate is moved further downward and the coil spring, 58, in the head causes the plunger, 56, to follow it, thus stripping the blank from the die. The head now comes to a stand still in the position indicated by Figure 12, so that there is a spring tension behind the plunger which serves to maintain the blank in place on the bed plate. The position of the cams corresponding to the stage of the folding operation shown in Figure 12 is represented in Figure 22. The bed plate is next elevated and at the same time the infolders are moved inward, causing a wiping action on the turned over sides of the blank, and causing these turned over sides to be compressed between the infolders and the bed plate, as shown in Figure 13. At the end of the stroke of the infolders, the bed plate is given a final positive upward press by its cam, 21, which position of the cam is shown in Figure 23. The roller, 20, now strikes a decided depression in its cam, 21, as shown in Figure 24, which allows the bed plate to fall away rapidly. The head continues to stand still, permitting the plunger, 56, to follow the bed plate, as indicated in dotted lines in Figure 13, a sufficient distance to insure the folded blank being entirely disengaged from the infolders and to prevent fouling on account of raveling threads if any exist. The roller, 49, finally strikes a sudden drop in its cam, as shown in Figure 25, allowing the head to fly up under the action of the heavy springs, 51, to carry the die, the plunger, and the clamp out of the way of the arm, 71, and the shelf, 80, which are moved in for the purpose of depositing a new blank between the fingers, 83, and for conveying the folded blank to the chute, 68.

While I have described the operation of the machine in considerable detail, it will be apparent that the novel method consists essentially in stripping the die from the blank. This is a considerable departure from the old method of collapsing the die in order to withdraw it from the blank. The steps in the above method broadly consist in first turning up the corners of the blank, next compressing the corners between the bed plate and the die, then folding the edges of the blank over the die, next stripping the die from the blank, and finally forcing the edges of the blank between the infolders and the bed plate to complete the folding operation. The preliminary folding of the corners may, of course, be omitted although the method is not quite as successful when it is.

Wide variations may be made in the machine and the method described without departing from the scope of the invention.

I claim:

1. In a machine of the class described, a bed plate, means for clamping the central part of a blank to the bed plate, a shelf, means for clamping the edges of the blank to the shelf to hold said edges, means for turning up the corners of the blank, a die, and means for actuating the bed plate and die to clamp the blank therebetween, the corners of the blank being folded by the clamping of the blank by the die and bed plate.

2. In a folding machine, a head, a clamp, an arm attached to the clamp, and means for securing the clamp to the head, said means comprising a fastening member extending through an elongated slot in the arm into the head and permitting relative movement of the arm and clamp with respect to the head.

3. In a folding machine, a bed plate and means operated by the bed plate to turn up the parts of a blank to be folded.

4. In a folding machine a frame having a top plate, a bed plate, a member movably positioned in the top plate, and means operated by the bed plate for actuating the member.

5. In a folding machine, a frame having a top plate, a bed plate, a shaft having an oblique end mounted in the top plate, a member secured to the shaft, and a pin movably positioned in the top plate and having a slot into which the oblique end of the shaft projects, said pin being adapted to be operated by the bed plate to rock the member.

6. The method of folding the edges of a blank comprising turning the edges of a blank over a die, stripping the die from the blank by relative movement of the die and the blank substantially perpendicular to the plane of the blank, the folded edges of the blank being opened up during said stripping by said die, and while retaining the blank in the same position subjecting the blank to pressure.

7. The method of folding the edges of a blank comprising clamping the center of the blank on a bed plate, turning the edges of the blank over a die by movable slides, withdrawing the slides, stripping the die from the blank by relative movement of the die and the blank substantially perpendicular to the plane of the blank, the folded edges of the blank being opened up during said stripping by said die, and while retaining the blank in the same position pressing the edges of the blank between the slides and the bed plate.

8. The folding method comprising clamping the center of the blank on a bed plate, turning up the corners of the blank, clamping the blank between a die and the bed plate, turning the edges of the blank over the die, stripping the die from the blank by relative movement of the die and the blank substantially perpendicular to the plane of the blank, the folded edges of the blank being opened up during said stripping by said die and while retaining the blank in the same position subjecting the blank to pressure to press down the folded edges.

9. The folding method comprising placing the blank on top of a shelf, clamping the sides of the blank on the shelf and the center of the blank on a bed plate, clamping the corners between a die and the bed plate, turning the edges of the blank over the die, stripping the die from the blank by relative movement of the die and the blank substantially perpendicular to the plane of the blank, the folded edges of the blank being opened up during said stripping by said die, and subjecting the blank to pressure to press down the folded edges.

10. In a machine of the class described, means operating in synchronism to fold blanks, a plurality of fingers for positioning the blanks in the machine, a shelf on which new blanks are adapted to be placed, and means for moving the shelf to deposit the blanks between the fingers and for withdrawing the shelf after the blanks have been deposited, said shelf having a plurality of slots to prevent interference of its operation by the fingers.

11. In a machine of the class described, means operating in synchronism to fold blanks, an arm, a shelf associated therewith on which a new blank is adapted to be placed, and means for moving the arm and shelf in over the folded blank, allowing the arm to fall on the folded blank, and retracting the arm and shelf whereby the folded blank is swept from the machine and a new blank left in its place.

12. In a folding machine a body portion forming part of the head, said body portion having a bore, a plunger movable within the bore, and a clamp associated with the head and adapted for relative movement with respect thereto, the body portion being adapted to move through the clamp.

13. The method of folding the edges of a blank comprising turning the edges of the blank over a die, subjecting the edges to pressure on said die to shape said edges by said die, stripping the die from the blank by relative movement of the die and the blank substantially perpendicular to the plane of the blank, the folded edges of the blank being opened up during said stripping by said die and while retaining the blank in the same position again subjecting the blank to pressure to press down the folded edges.

14. In a machine of the class described, a bed plate, a die, means for actuating said die and bed plate to clamp a blank therebetween, means for turning up the corners of the blank prior to the clamping of the blank by the die and bed plate, and means for holding the edges of the blank while the corners are being turned up, the clamping of the blank by the die and bed plate causing the turned-up corners of the blank to be folded and the folded corners clamped between the die and bed plate.

15. A machine of the class described comprising a die, infolders, and a bed plate, means operating in synchronism to clamp a blank on the bed plate and fold the edges of the blank over the die, means for withdrawing the die from the blank by a movement normal to the plane of the blank to cause the folded edges to open during withdrawal while retaining the blank clamped in the same position on the bed plate, and means operable after the die has been withdrawn to press the edges down and clamp them between the bed plate and infolders.

16. A machine of the class described comprising a die, slides, bed plate, and a head, said head embodying an inner plunger constituting a clamp and an outer plunger concentric therewith constituting a die, means for operating said parts in synchronism to clamp a blank on the bed plate by the inner plunger, fold the edges of the blank over the die by the slides, and withdraw the die after the edges have been folded while the plunger remains in clamping position, said inner plunger having an area substantially equal to the area of that portion of the blank lying within the folded edges of the blank.

17. A machine of the class described comprising a die, slides, bed plate and a head, said head embodying an inner plunger constituting a clamp and an outer plunger concentric therewith constituting a die, means for operating said parts in synchronism to clamp a blank on the bed plate by the inner plunger, fold the edges of the blank over the die by the slides, withdraw the die from the folded blank after the edges have been folded, while retaining the blank clamped to the bed plate in the same position by the inner plunger, and press the edges between the slides and bed plate, said inner plunger having an area substantially equal to the area of that portion of the blank lying within the folded edges of the blank.

18. The combination with die, slides, bed plate, shelf and a head embodying an inner plunger constituting a clamp, an outer plunger forming a die, and a clamping member, around the outer plunger, of means for operating said parts in synchronism to clamp a blank on the bed plate by the inner plunger, clamp the edges of the blank on the shelf, turn up and press over the corners of the blank between the die and bed plate, then fold the edges of the blank over the die, withdraw the die from the blank while retaining the blank clamped to the bed plate by the inner plunger and press the edges between the slides and bed plate.

19. The method of folding the edges of a blank which comprises applying uniform pressure to the body of the blank, folding the corners of the blank, applying pressure to the folded corners, folding the edges of the blank over a form and applying pressure thereto, stripping the blank from the form, refolding the edges after the stripping process, and again applying pressure to the folded edges, said stripping and folding processes being performed without releasing the pressure from the body of the blank.

20. In a folding maching comprising a shelf, a rigid die, slides, and a bed plate, means for depositing a blank to be folded upon said shelf, means for raising said bed plate and lowering said die to clamp the blank therebetween, means for causing said slides to move radially inwardly to fold the edges of the blank over said die, means for withdrawing the slides radially outwardly to permit withdrawal of said die in a line normal to the plane of the blank, and means for again displacing said slides radially inwardly to their former position and pressing the blank between the slides and the bed plate.

21. In a folding machine comprising a bed plate, slides, and a head, said head carrying a concentrically mounted die and clamping member, means for positioning a blank between the bed plate and the clamping member, means for moving the head and bed plate relatively to each other to clamp the blank between the clamping member and bed plate, means for folding the corners of the blank, means for moving the die to clamp said corners in folded position, means for moving the slides to fold the edges of the blank over the die, and withdrawing the slides after the folding process, means for imparting relative motion axially to the die and clamping member to strip the blank from the die, and means for again moving the slides to refold the blank edges and to press the blank between the bed plate and the slides.

22. In a machine for folding a blank, a clamp for applying uniform pressure to the body of the blank, a rigid die to fit over the clamping member, means for folding the edges of the blank over the die, means for pressing the folded edges, means for separating the die from the clamping member to strip the blank from the die, and means for again refolding and pressing the edges of the blank, all of said means functioning without releasing the pressure of the clamping member on the blank.

In testimony whereof, I have signed my name to this specification this 4th day of August, 1926.

EDWARD B. ROBY.